April 21, 1959

J. H. WHEELER ET AL 2,882,976

MACHINE FOR HARVESTING CROPS

Filed Nov. 7, 1955

INVENTORS.
John H. Wheeler
Ralph L. Wheeler
BY
William D. Hager
ATTORNEY

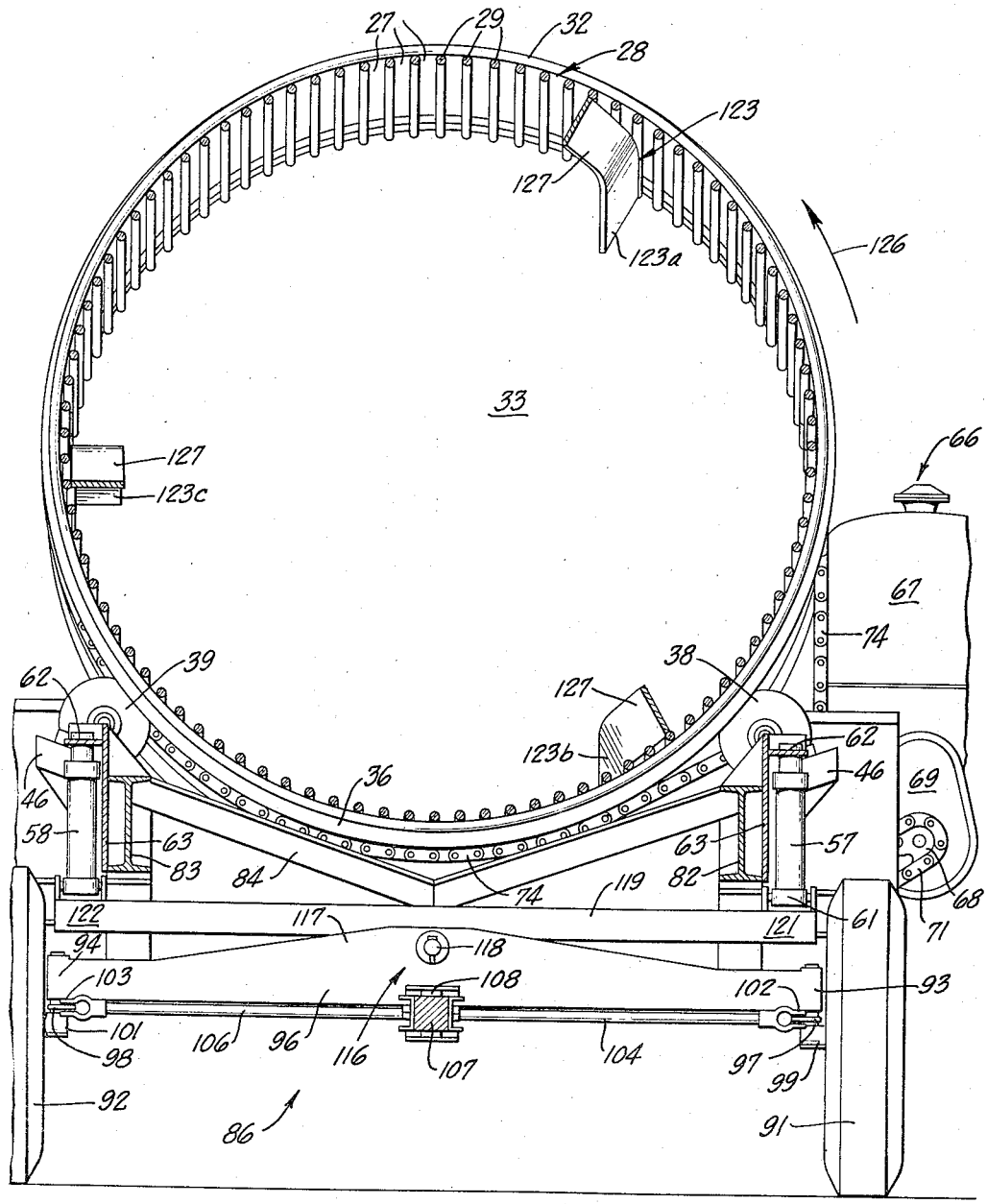

April 21, 1959
J. H. WHEELER ET AL
2,882,976
MACHINE FOR HARVESTING CROPS
Filed Nov. 7, 1955
9 Sheets-Sheet 3
FIG_3_
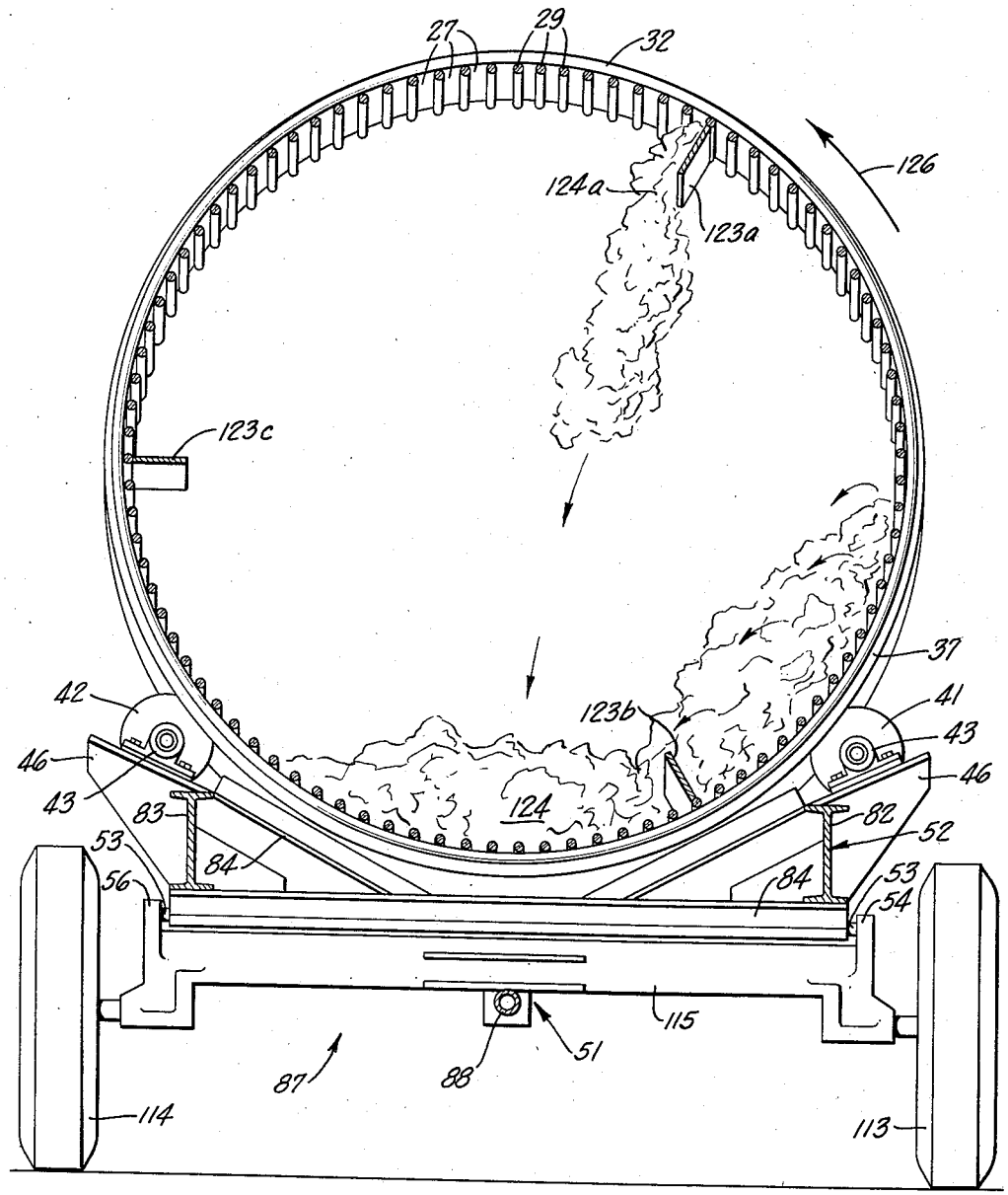
INVENTORS.
John H. Wheeler
Ralph L. Wheeler
BY
William D. Hager
ATTORNEY April 21, 1959  J. H. WHEELER ET AL  2,882,976
MACHINE FOR HARVESTING CROPS
Filed Nov. 7, 1955                                       9 Sheets-Sheet 4
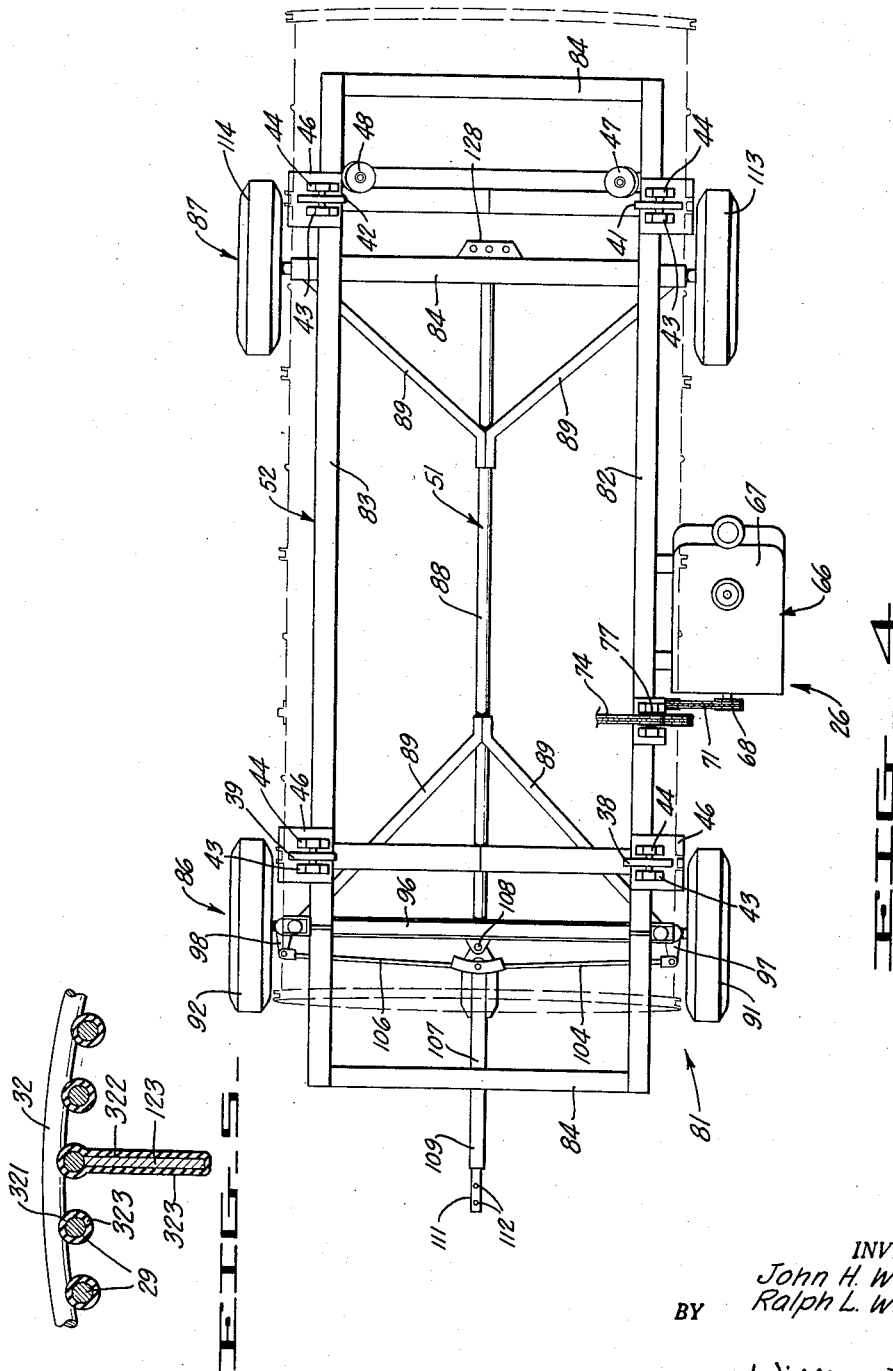
INVENTORS.
John H. Wheeler
Ralph L. Wheeler
BY
William D. Hager
ATTORNEY

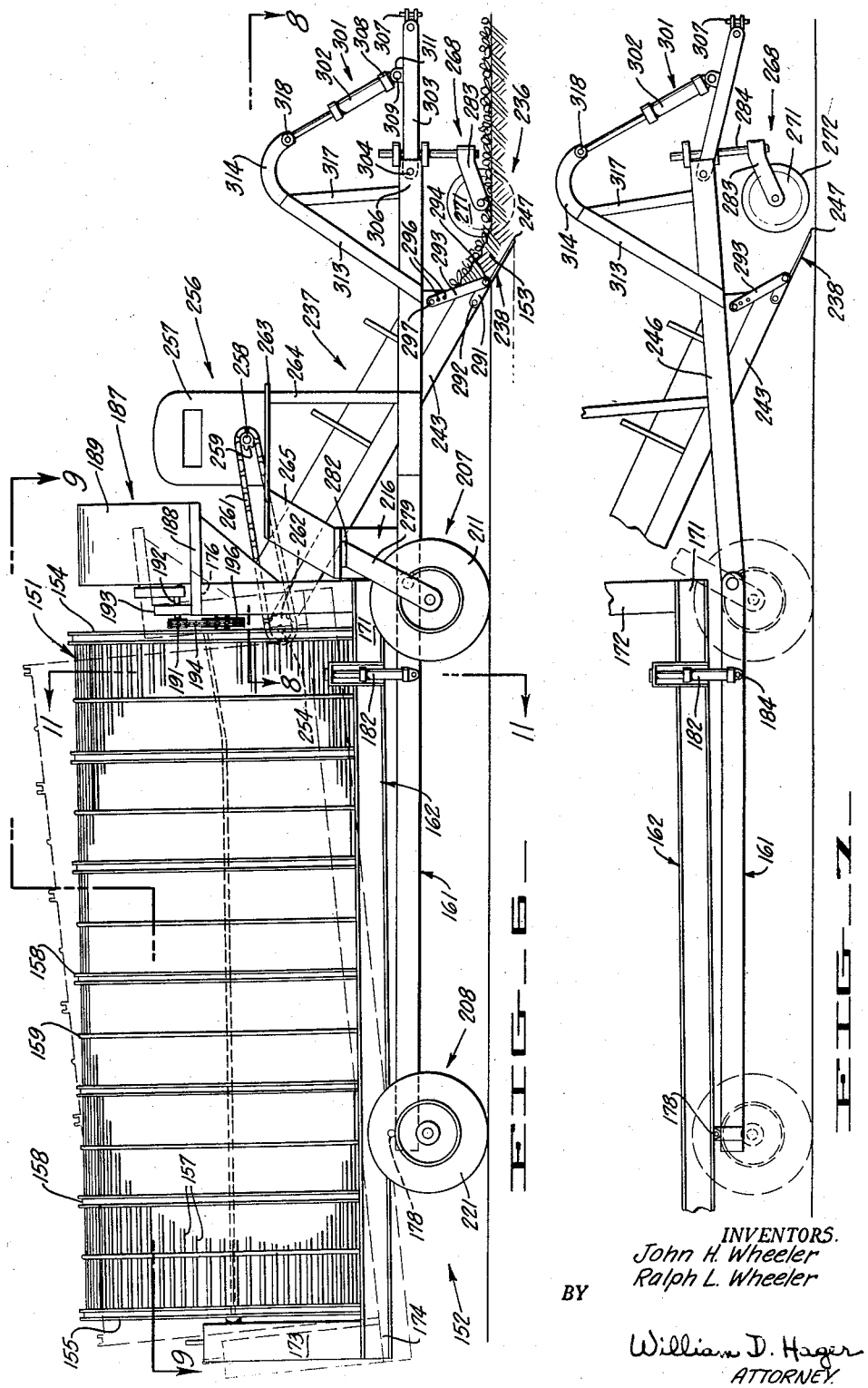

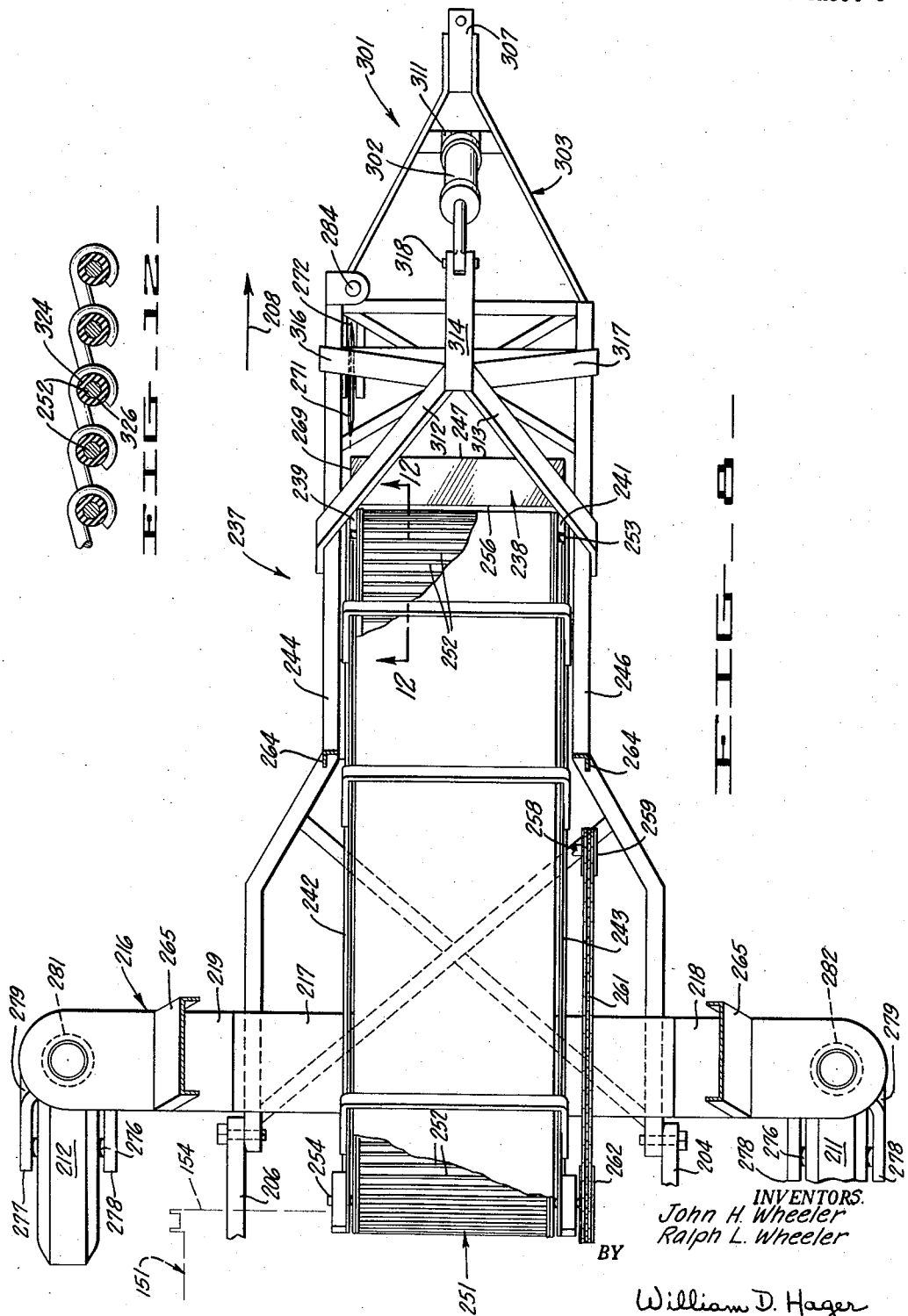

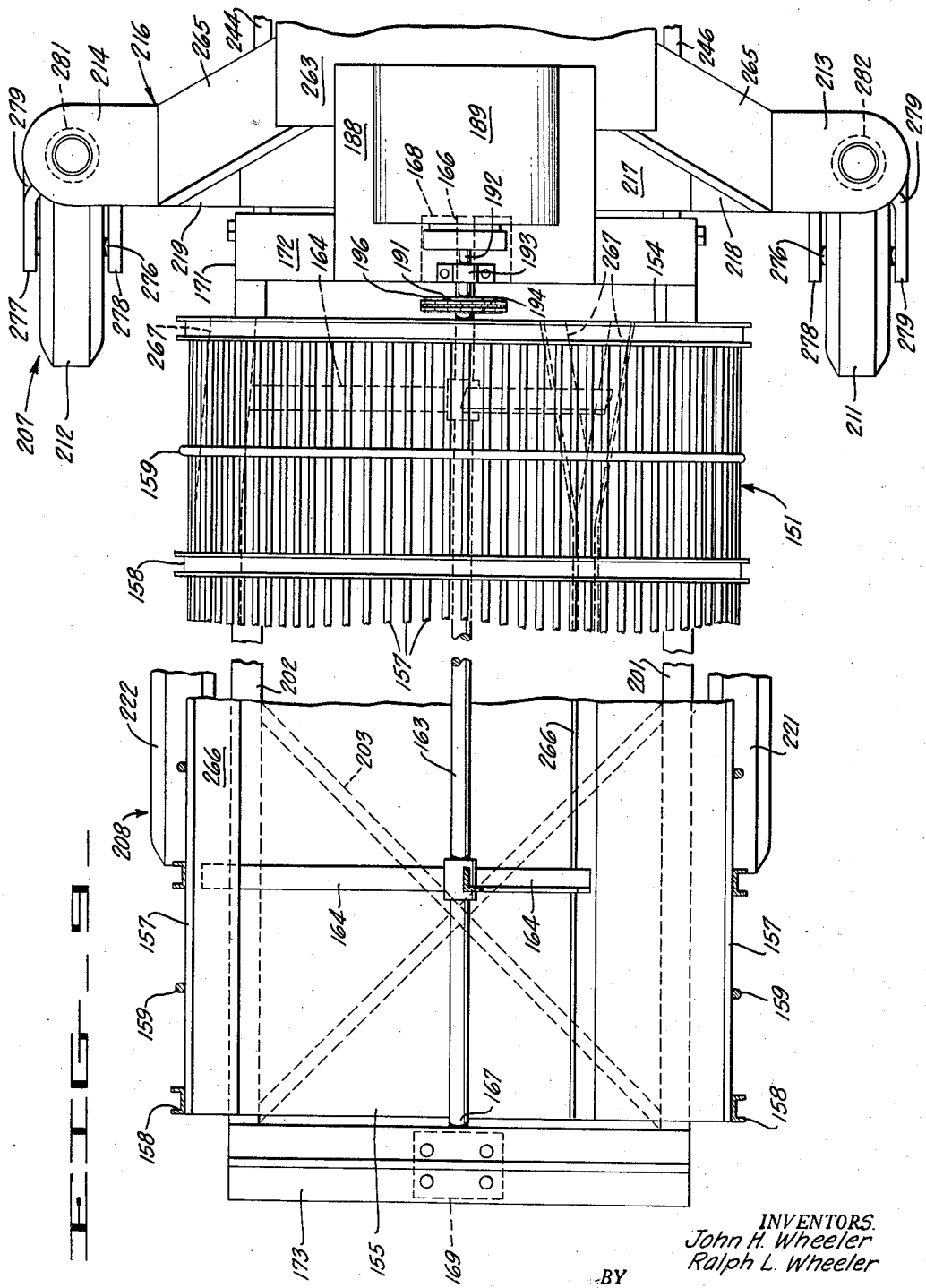

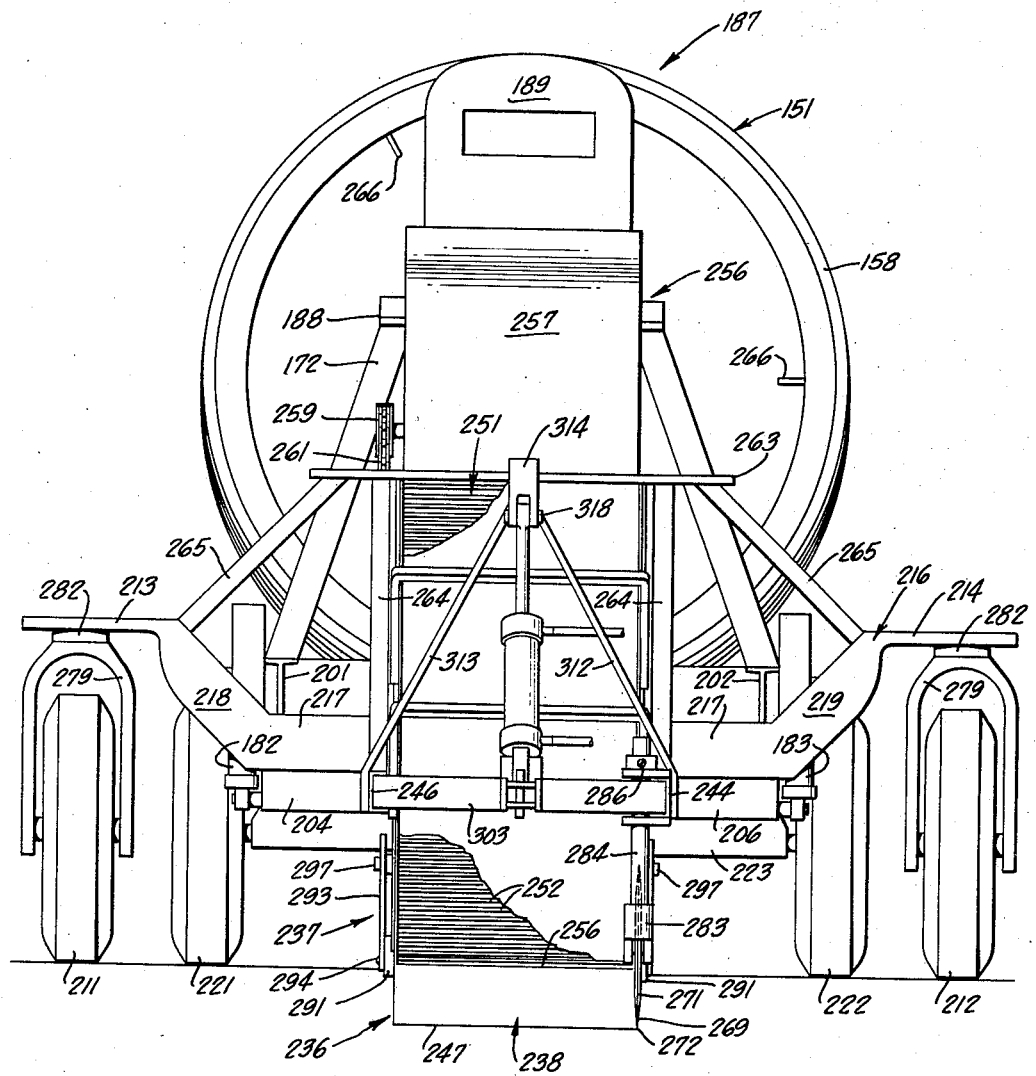

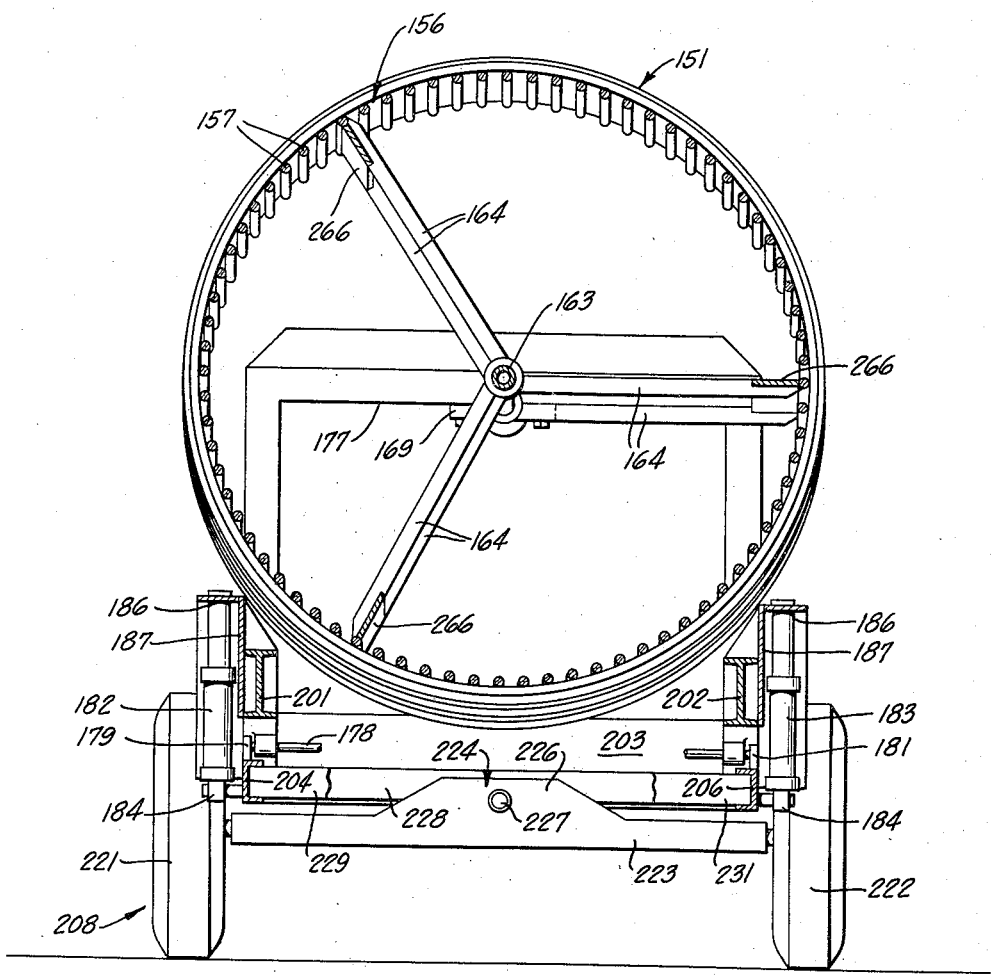

United States Patent Office 2,882,976
Patented Apr. 21, 1959

2,882,976

MACHINE FOR HARVESTING CROPS

John H. Wheeler and Ralph L. Wheeler, Los Molinos, Calif.

Application November 7, 1955, Serial No. 545,162

4 Claims. (Cl. 171—128)

The invention relates to harvesting equipment, and more particularly to devices for separating plants such as root crops and the like from the soil in which they are grown.

Rapid improvement has been accomplished in agricultural machinery in recent years, especially in mass planting and crop tending devices, but machinery for taking the crops from the field has lagged behind and much of this work is presently performed by expensive and undependable hand labor. A manifest need has arisen for powered equipment capable of performing a more efficient harvesting of crops in the nature of root crops which grow in the soil. Typically, fields of such crops are now ploughed up so as to loosen the root structure of the plants from the surrounding soil and the crops are then laboriously separated and removed from the soil by hand.

The present invention contemplates self-powered machinery particularly adapted to greatly reduce the number of persons required to harvest a given area, and to accomplish such harvesting in a more efficient manner. It is, therefore, a principal object of the present invention to provide a power driven machine which will rapidly and efficiently separate and remove the roots of plants from the soil in which they are grown in a positive manner assuring a complete recovery of such plants.

Another object of the present invention is the provision of a machine for economically separating and removing crops from the surrounding soil with a minimum of injury to the crops being harvested.

A further object of the invention is to provide a device adapted to receive crops intermixed with the soil which will pulverize and separate out the soil and deliver the crops in substantially clean condition.

Another object of the invention is to provide a machine of the character described which will strip a layer of crop bearing soil from a field, and in a continuous action separate out and remove the crops and return the soil to approximately its previous location in the field.

A still further object of the invention is the provision of a device of the character above constructed and proportioned to impart a gentle tumbling action to the crops and intermixed soil which will pulverize and remove the soil without injury to the crops.

Yet another object of the present invention is to provide, in a machine of the character above, a resilient, cushioned action reducing to a minimum the possibility of cutting or bruising crops of a tender or easily bruised nature.

Still another object of the present invention is the provision, in a machine for separating and removing crops from the soil, of a suspension system which will permit rapid and stable travel over rough ground, as encountered in fields, with a minimum of sidesway from bumps or holes.

A further object of the present invention is to provide a harvesting machine of the character described which is adapted for cleanly severing a strip of crop bearing soil from the adjacent areas of the field in a continuous action so as to prevent tearing apart of intertwined plants or the pulling up of clumps adjacent to the strip being severed.

Another object of the present invention is the provision of adjusting means in a harvesting machine of the character described operable to vary the depth of the strip of crop bearing soil being severed, and to adjust the separating action of the device to different types and qualities of soil and moisture conditions.

A still further object of the present invention is to provide a harvesting machine of the character above in a rugged unit having a minimum number of sturdily formed parts together with dependable and simple drive and adjusting means.

Other objects and features of advantage will be apparent from a consideration of the following description and the accompanying drawings forming part of this application. In the drawings:

Figure 2 is an enlarged cross sectional view of the harvesting machine taken substantially on the plane of line 2—2 of Figure 1, portions of the structure being broken away to conserve space.

Figure 3 is an enlarged cross sectional view of the machine taken substantially on the plane of line 3—3 of Figure 1.

Figure 4 is a plan view of the chassis portion of the machine of Figure 1 with overlying structure being indicated by phantom lines.

Figure 5 is an enlarged fragmentary cross sectional view taken substantially on the plane of line 3—3 of Figure 1 and illustrating a modified form of the invention.

Figure 6 is a side elevational view of another form of the harvesting machine of the present invention.

Figure 7 is a side elevational view of the lower portion of the machine of Figure 6 illustrating the various parts in a different operative position.

Figure 8 is a fragmentary plan view on an enlarged scale taken substantially on the plane of line 8—8 of Figure 6.

Figure 9 is a plan view partially in section taken along staggered line 9—9 of Figure 6 with certain elements of the structure being omitted in order to present still further details of the invention with greater clarity.

Figure 10 is a front elevational view on an enlarged scale of the harvesting machine of Figure 6, with portions thereof broken away to illustrate interior structure.

Figure 11 is a vertical cross sectional view on an enlarged scale taken substantially on the plane of line 11—11 of Figure 6.

Figure 12 is an enlarged fragmentary cross sectional view taken substantially on the plane of line 12—12 of Figure 8 and illustrating another portion of the modified form of the invention of Figure 5.

Figure 1:
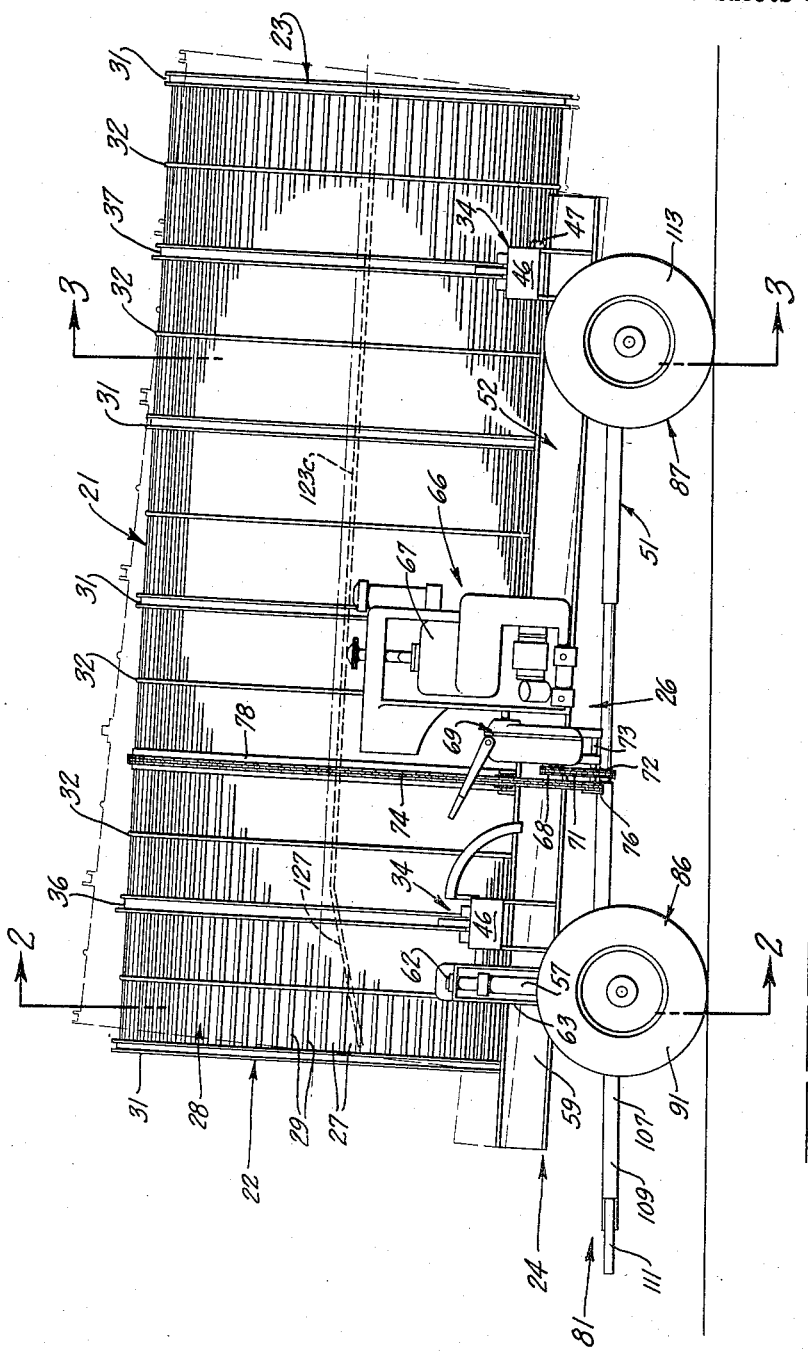
Figure 1 is a side elevational view of a machine for separating and removing crops from the soil constructed in accordance with the present invention.

The harvesting machine of the present invention, and as illustrated in Figures 1 through 4 of the accompanying drawings, includes a trommel 21 of elongated cylindrical form having an open intake end 22 for receiving crops intermixed with the soil in which they are grown, and an opposite open discharge end 23, together with frame means 24 supporting the trommel 21 in generally horizontal position for rotation about its longitudinal axis with the intake end 22 elevated above the discharge end 23 so that crops and soil within the trommel will gravitate toward the discharge end upon rotation of the trommel as by drive means 26, the trommel 21 being formed with openings 27 dimensioned to permit the soil to fall therethrough while retaining the crops within the trommel for delivery from the discharge end 23.

In accordance with the present invention, the trommel 21 consists essentially of a perforated cylindrical wall 28 formed to provide the aforementioned openings 27. As here shown, the wall 28 is defined by a plurality of longitudinally extending rods 29 secured, as by welding, in parallel spaced relation around the inner peripheries of aligned ring shaped members 31. For desired stiffness and resistance to distortion, the ring members 31 are preferably fabricated of channel stock and located at intervals along the length of the trommel. If desired, additional bracing of the trommel wall 28 may be effected by the addition of ring shaped bars 32 between the members 31. As will be apparent from Figures 2 and 3, the spacing of the rods provides the perforations or openings 27 through which soil may fall from the interior 33 of the trommel, the crops being retained within the trommel by the rods. Therefore the amount of spacing of the rods is determined by the nature of the crop to be harvested, the spacing being somewhat less than the smallest dimension of the crop. For example, in harvesting root crops such as carrots and potatoes, it will be obvious that, while a spacing of two or three inches might retain the potatoes, a smaller spacing on the order of one inch or less would be required for carrots.

In the form of the invention shown in Figures 1 through 4 the trommel 21 is mounted for rotation about its axis on roller means 34 carried by the frame means 24 for engagement with ring shaped grooved track members 36 and 37 mounted adjacent to the inlet and discharge ends 22 and 23 respectively of the trommel. The roller means 34 includes a first pair of rollers 38 and 39 rotatably supporting track 36, see Figure 2, and a second pair of rollers 41 and 42 rotatably supporting track 37, see Figure 3. As will be noted, the rollers are spaced laterally from the centerline of the trommel by a distance sufficient to insure the trommel remaining on the rollers by force of gravity alone. As shown in Figures 1 and 3, each of the rollers 38, 39, 41 and 42 is journaled in bearings 43 and 44 mounted on brackets 46 which are secured to and extend outwardly from the frame means 24. Because of the normally inclined position of the trommel an additional pair of rollers 47 and 48 are journaled to the frame means 24 in position to engage and bear against the rear side of track 37 and prevent any possible tendency of the rollers 38, 39, 41 and 42 to leave their respective tracks.

As an important feature of the present invention, means is provided for varying the inclination of the trommel 21 between the positions shown in solid and phantom lines in Figure 1 in order to control the rate at which the crops pass therethrough. Preferably the frame means 24 consists of a main frame 51 and a subframe 52 which supports the trommel and is tiltable with respect to the main frame so as to adjustably elevate or lower the intake end 22 to any desired position with respect to the discharge end 23. As here shown, the subframe 52 is pivotally connected to the main frame 51 adjacent to the rear or discharge end 23 of the trommel by means of a shaft 53 secured to the subframe and journaled in bosses 54 and 56 on the main frame, see Figure 3. Adjustable variation of the inclination of the trommel is afforded by power means, here in the form of hydraulic cylinders 57 and 58, connected between the forward end 59 of the subframe 52 and the main frame 51. As may best be seen in Figures 1 and 2 of the drawings, the cylinders 57 and 58 are each pivotally supported at their lower ends 61 on the main frame 51 with their upper ends 62 bearing upwardly against bracket members 63 secured to the subframe 52. The cylinders 57 and 58 are adapted for connection to a source of hydraulic fluid under pressure (not shown) such as a standard hydraulic pump of the type well known in the art. From the foregoing it will be apparent that energizing of the hydraulic cylinders 57 and 58 will tend to urge the forward end 59 of the subframe upwardly away from the main frame and, since the trommel is supported on the subframe, will thus selectively urge the intake end 22 upwardly and provide for the aforementioned vertical adjustment thereof relative to the discharge end 23.

The drive means 26 for rotating the trommel 21 about its longitudinal axis includes a motor means 66 operatively connected to the trommel by a chain drive. As here shown, the motor means consists of a gasoline engine 67 mounted on the subframe 52 and adapted to drive a sprocket 68 through a gear reducing transmission 69. Engaged with sprocket 68 is a roller chain 71 which also engages and drives a sprocket 72 mounted on a jack shaft 73 journaled on subframe 52. A second chain 74 is engaged with a sprocket 76 secured to the jack shaft 73 and an idler sprocket 77 mounted on the subframe 52. The chain 74 passes completely around the trommel 21 and is engaged with a sprocket tooth carrying member 78 secured to the outer sides of the trommel rods 29, see Figures 1 and 2. As will be noted, the entire drive means 26 is supported on the subframe 52 for vertical displacement therewith and consequently is unaffected by operation of the hydraulic cylinder means for adjusting the inclination of the trommel.

In accordance with the present invention, the trommel 21 is preferably mounted on a chassis 81 for movement over the field being harvested so that the soil and crops may be fed directly into the device, the crops separated from the soil, and the soil returned automatically to its approximate previous location in the field, all in one continuous and rapid action. In the form of machine illustrated in Figures 1 through 4 of the drawings, subframe 52 consists of a pair of longitudinally extending beams 82 and 83 upon which are mounted the above described roller means 34 and drive means 26, the beams 82 and 83 being rigidly held in parallel spaced relation by a series of cross members 84 formed to pass beneath the trommel 21. The main frame 51 desirably forms part of the chassis 81 which includes forward and rearward wheel assemblies 86 and 87, respectively, and a central longitudinal member 88 secured to the wheel assemblies. Preferably, the longitudinal member 88 is of tubular form and is provided with diagonal braces 89 extending to the outer ends of the wheel assemblies. The forward wheel assembly 86 includes a pair of wheels 91 and 92 mounted at the outer ends 93 and 94 respectively of a horizontally extending connecting member 96. The wheels 91 and 92 are preferably mounted for easy steering of the machine and have forwardly extending arms 97 and 98 secured to axle housings 99 and 101 which are pivotally attached at 102 and 103 to the connecting member ends 93 and 94. Link members 104 and 106 are connected to the distal ends of the arms 97 and 98 and to a draw bar 107 pivotally connected as by pin 108 to the member 96. The forward end 109 of draw bar 107 is provided with a hitch attachment 111 having openings 112 therein for the draw pin of a tractor or the like (not shown). It will be noted that movement of the tractor around a corner will swing the draw bar 107 to one side and this will in turn cause a swinging of the wheels 91 and 92 in the same direction. The rearward wheel assembly 87 consists of a pair of wheels 113 and 114 journaled to a horizontal connecting member 115 which is in turn connected to the longitudinal chassis member 88.

As another important feature of the present invention, a relative tilting action is provided for between the forward and rearward wheel assemblies 86 and 87 so as to increase the stability of the harvesting machine as it traverses rough and uneven ground of the type found in agricultural fields. For effecting the above mentioned tilting action, a type of rocking bolster 116 is provided on the forward wheel assembly 86. As here shown this bolster is formed by an upward extension 117 of member 96 through which passes a pin 118 pivotally supporting a horizontal rocking member 119 which in turn supports beams 82 and 83 at its outer ends 121 and 122 respectively. It will be apparent that, should either of the wheels 91 or 92 drop into a depression or strike a bump, the member 96 may tilt without causing a corresponding tilting of the trommel.

As an important feature of the present invention, the harvesting machine is formed to gently lift a portion of the mass of intermixed soil and crops and tumble such portion back into said mass in such manner as to pulverize and clean the soil from the roots of the crop, the soil dropping through the openings 27 in the trommel 21 and the crops passing rearwardly during such action for delivery from the discharge end 23. To aid in such lifting and tumbling action, a plurality of longitudinally extending baffles 123 are secured as by welding to the internal periphery of the trommel wall 28 and extending inwardly into the trommel interior 33. The baffles are dimensioned and spaced so that the portion of the mass of soil and crops lifted by each baffle will fall substantially to the rear of the next succeeding baffle. It has been found that a trommel of approximately five to six feet in diameter and ten to fifteen feet long will be suitable for most crops, and in such a trommel three baffles provide a very effective lifting and tumbling action. As shown in Figures 2 and 3, the three baffles 123a, 123b and 123c are spaced equidistantly at intervals of 120 degrees around the internal periphery of the trommel, the portion 124a of the mass of soil and crops 124 tumbling down from the baffles in approximately the position illustrated when the trommel is rotated in a counter-clockwise direction as indicated by arrow 126.

As will be noted from Figures 1 and 2 of the accompanying drawings, the forward ends 127 of the baffles 123 are inclined in the direction of rotation of the trommel (as indicated by arrow 126 of Figure 2). This inclining of baffle ends 127 causes them, on rotation of the trommel, to act in a manner analogous to an auger or spiral conveyor to quickly urge the soil and crops entering the trommel intake end 22 rearwardly into the body of the trommel and thus prevent any spilling of the soil and crops therefrom.

The cleaned and separated crops may be taken from the discharge end 23 of the trommel 21 in any suitable manner such as by funneling into bags or other containers (not shown). Preferably, the chassis 81 is provided with a hitching attachment 128, here mounted on wheel connecting member 115, to which a suitable wheeled cart (not shown) may be attached.

The form of the present invention illustrated in Figures 6 through 11 of the accompanying drawings includes a trommel 151, similar in form to the trommel 21 of Figures 1 through 4, mounted upon a chassis 152 for movement over the ground, and means carried by the chassis 152 and adapted for stripping a layer 153 of crop bearing soil from the ground and feeding such layer into the intake end 154 of the trommel 151 for passage therethrough to the discharge end 155. Said trommel consists of a perforated cylindrical wall 156 defined by a plurality of longitudinally extending rods 157 secured, as by welding, in parallel spaced relation around the inner peripheries of aligned ring shaped members 158 and 159 corresponding generally to the members 31 and 32 of Figure 1. As in trommel 21, the spacing of the rods provides the perforations or openings through which soil may fall from the interior of the trommel, and as previously described the amount of spacing is determined by the nature of the crop to be harvested.

As here shown, the trommel 151 is carried on a main frame 161, provided by chassis 152, supporting a subframe 162 which in turn supports the trommel and is tiltable with respect to the main frame (in the manner of the subframe 52 of Figure 1) so as to adjustably elevate or lower the intake end 154 of trommel 151 with respect to the discharge end 155. The mounting of the trommel 151 on subframe 162 is designed to reduce fouling of the operating parts by soil and other debris to a minimum. To accomplish this the operating parts are moved upwardly to positions at or above the centerline of the trommel. As may best be seen from Figures 9 and 11 of the drawings, the trommel 151 is provided with an axially extending shaft 163 having outwardly extending arms 164 secured to the wall 156 of the trommel adjacent to the intake and discharge ends 154 and 155. The opposite ends 166 and 167 of the shaft 162 extend forwardly and rearwardly respectively, through the trommel intake and discharge ends, and are journaled in self aligning bearings 168 and 169. Mounted on the forward end 171 of the subframe 162 is an upwardly extending frame member 172 to which bearing 168 is attached, while a similar frame member 173 is carried on the rearward end 174 of the subframe for the support of bearing 169. Preferably, the bearings 168 and 169 are mounted on the undersides 176 and 177 of the frame members 172 and 173 respectively so that the frame members will act as shields to protect the bearings from falling dirt and debris.

The means for adjustably elevating or lowering the intake end 154 of the trommel 151 is similar to that shown in the machine of Figure 1 and consists in pivotally connecting the subframe 162 to the main frame 161 and interposing power means therebetween which is adapted to urge the subframe and trommel carried thereby upwardly between the positions shown in solid lines and phantom lines in Figure 6 to the selected position desired. As may be seen in Figures 6, 7 and 11, the subframe 162 is pivotally mounted on the main frame 161 by means of a shaft 178 secured to the subframe and journaled in bosses 179 and 181 on the main frame. The aforementioned power means here includes a pair of hydraulic cylinders 182 and 183 connected between the forward end 171 of the subframe 162 and the main frame 161. As here shown, the cylinders 182 and 183 are each pivotally supported at their lower ends 184 on the main frame 161 with their upper ends 186 bearing upwardly against bracket members 187 secured to the subframe 162. Cylinders 182 and 183 are adapted for connection to a source of hydraulic fluid under pressure and tend, upon energization, to urge the forward end 171 of the subframe upwardly away from the main frame and thus effect the desired vertical adjustment of the trommel in a manner similar to that accomplished by the machine of Figure 1.

Rotation of the trommel 151 is here effected by drive means 187 which is carried on an extension 188 of frame member 172 and which is operatively connected to the trommel 151 by a chain drive. Preferably, the drive means 187 is provided by a gasoline engine 189 of the type shown in Figure 1 and which has a drive sprocket 191 on a drive shaft 192 journaled in bearing 193, the sprocket 191 being engaged with a roller chain 194 which is in turn entrained around a sprocket 196 secured to the trommel shaft 163, see Figures 6 and 9. As will be noted, the entire drive means 187 is supported together with the trommel 151 on the subframe 162 for vertical displacement therewith and consequently is unaffected by operation of the hydraulic cylinder power means during adjustment of the inclination of the trommel.

In the form of the machine illustrated in Figures 6 through 11 of the drawings, the subframe 162 consists of a pair of longitudinally extending beams 201 and 202 which are rigidly held in parallel spaced relation by a series of cross members 203 formed to pass beneath the trommel 151. The main frame 161 desirably forms part of the chassis 152 and includes a pair of longitudinal frame rails 204 and 206 to which are attached the bosses 179 and 181 and forward and rearward wheel assemblies 207 and 208 respectively. Suitable cross-bracing (not shown) may be secured to the frame rails 204 and 206 to impart a desired rigidity to the chassis structure.

As an important feature of the present invention, the forward wheel assembly 207 is formed with a comparatively broad tread designed to provide a wide lateral base for the machine and hence reduce any tendency to rock or sway from side to side due to irregularities in the surface of the field. As may best be seen in Figures 8, 9 and 10, this wide base is here afforded by mounting a pair of wheels 211 and 212 at the outer ends 213 and 214 of a transversely extending connecting member 216 secured to the main frame rails 204 and 206, the wheels 211 and 212 and the connecting member 216 forming a portion of the forward wheel assembly 207. The connecting member 216 is preferably of flattened V-shape when viewed from the front of the machine as in Figure 10, and includes a central horizontal section 217, mounted on rails 204 and 206 and inclined portions 218 and 219 secured to the horizontal ends 213 and 214. It will be noted in this connection that the shape and location of the ends 213 and 214 afford protection for the mountings of wheels 211 and 212 from falling dirt and debris. With reference to the transverse spacing of the wheels 211 and 212, a width of tread of approximately the height of the machine has been found to smooth out any sidesway of the machine in rapid transit over rough ground to within permissible limits.

In accordance with the present invention, a relative tilting action is provided for between the forward and rearward wheel assemblies 207 and 208 to reduce any tendency of the machine to sway from side to side. As here shown, the rearward wheel assembly 208 includes a pair of wheels 221 and 222 journaled on a transverse connecting member 223. A rocking bolster 224, similar to bolster 116 of Figure 3, is provided on the member 223, and preferably consists of an upward extension 226 of member 223 through which passes a pin 227 pivotally supporting a horizontal rocking member 228 which in turn supports frame rails 204 and 206 at its outer ends 229 and 231 respectively. It will be apparent from Figure 10 that, should either of the wheels 221 or 222 drop into a depression or strike a bump, the bolster mounting of the rearward wheel assembly will cooperate with the wide wheel spacing of the forward wheel assembly in reducing any swaying tendency of the machine.

As an important feature of the present invention, the aforementioned means for stripping a layer 153 of crop bearing soil from the ground and feeding such layer to the intake end 154 of the trommel 151 includes digging means 236 movable with the chassis 152 and formed for effecting such stripping upon movement of the chassis 152 over the ground together with elevator means 237 carried on the chassis and adapted for conveying the aforesaid layer of crop bearing soil from the digging means into the trommel. Considering first the digging means 236, it will be seen from Figures 6, 7, 10 and 11 that such means here includes an inclined digging blade 238 carried at the forward ends 239 and 241 of inclined members 242 and 243 which are secured to longitudinal beams 244 and 246 pivotally connected to and extending forwardly from the main frame rails 204 and 206. The blade 238 is here of generally flattened rectangular form and is sharpened along one of its longer edges 247. In accordance with the invention, said blade is mounted with its sharpened edge 247 presented forwardly, that is away from the trommel, and is positioned transversely to the direction of movement of the machine (as indicated by arrow 248). As will be apparent from Figures 6 and 10, forward movement of the machine will cause the blade 238 to slice a layer of crop bearing soil from the ground in a continuous strip for feeding into the trommel.

The elevator means 237 includes an inclined conveyor 251 adapted to receive the layer 153 of crop bearing soil from the digging blade 238 and to transport the same upwardly and into the intake end 154 of the trommel 151. Preferably, the conveyor is of the so-called "potato chain" type formed with a plurality of spaced members, such as transversely extending rods 252, which define an open belt-like structure movable around pulleys mounted on shafts 253 and 254 journaled at the opposite ends of the inclined members 242 and 243. As will be noted, the lower shaft 253 is positioned at the rear edge 256 of the digging blade 238 so that the layer 153 from the blade will pass onto the upper surface of the conveyor 251, and the upper shaft 254 is positioned at the intake end 154 of the trommel 151 so the crops and soil will fall from the conveyor directly into the trommel. The open construction of the conveyor rods 252 will allow any soil already loosened from the roots of the crop to fall therebetween and back onto the ground, it being obvious that the spacing of the rods 252 is such as to prevent the crop plants from falling therethrough with such soil.

As a feature of the present invention, the conveyor 251 is adapted to cooperate with the digging blade 238 to separate and pull apart bunches of crops which might have entangled foliage or roots. Such separation is here effected by the provision of a drive means 256 for the conveyor 251 which is adapted to drive the conveyor at a speed faster than the speed at which the chassis 152 is passing over the ground. As the layer 153 of soil and crops passes onto the upper surface of the conveyor, the rods 252 will be moving backwardly relative to the layer and will function to engage and pull apart the layer as aforesaid. Conveniently, the drive means 256 may consist of a gasoline engine 257, similar to the trommel driving engine 189, having a drive shaft 258 and connected drive sprocket 259 around which is entrained a roller chain 261 engaged with a sprocket 262 on the conveyor shaft 254. The engine 257 is here supported on a platform 263 mounted on the frame beams 244 and 246 by means of members 264 and 265 secured to beams 244, 246 and member 216 respectively.

The trommel 151, as illustrated in Figures 6 through 11 of the drawings, employs a gentle lifting and tumbling action upon the intermixed soil and crops therein, similar to that employed by the trommel 21 of Figure 1. The trommel 151 is provided with a plurality of longitudinally extending baffles 266 similar to baffles 123 of trommel 21, baffles 266 also being inclined in the direction of rotation of the trommel at their forward ends 267 adjacent to the intake end of the trommel.

In accordance with the present invention, the digging means 236 may include a cutting means 268 positioned at one end 269 of the digging blade 238 for engaging and separating the layer 153 of soil and crops from the adjacent crops. It will be appreciated that in harvesting crops having tangled roots or foliage, such cutting means may become highly desirable in affording a clean stripping action to prevent tearing and gouging up of large clumps adjacent to the path of the machine. As here shown, the cutting means 268 consists of a colter disk 271 having a circumferential sharpened edge 272, said colter disk being mounted for rotation in a vertical plane with edge 272 extending downwardly adjacent to the conjunction of the end 269 and sharpened edge 247 of the digging blade 238.

In order to obtain an easy steering of the machine of Figures 6 through 11, the forward wheels 211 and 212, and the colter disk 271 are caster mounted so as to provide a swiveling action. As may best be seen from Figures 6, 8, 9 and 10, the wheels 211 and 212 are each journaled on a short axle 276 carried at the distal ends 277 and 278 of a fork member 279. The fork members 279 are pivotally mounted in bearings 281 and 282 secured to the end portions 213 and 214 of the connecting member 216 for rotation about a vertical axis with the axles 276 spaced horizontally from such axis. In this manner, the entire forward end of the machine may be freely swung from side to side, it being noted in this connection that the flattened V-shape of the connecting member 216 is proportioned to allow the fork members to rotate through a full 360 degrees of arc. The colter disk 271 is similarly caster mounted on a fork member 283 which is journaled for rotation on a vertical rod 284. Preferably, the rod 284 is slidably secured to the beam 246 by a setscrew 286 or the like so as to provide a desired vertical adjustment of the depth of the colter disk.

Means is provided for selectively varying the depth of cut of the digging means 236 in accordance with the depth of penetration of the soil by the roots of the plants being harvester so that the layer 153 of soil and crops will include all the desirable portion of the crop root without being unnecessarily deep. As shown in Figure 6 of the drawings, such means is afforded by pivotally securing ears 291 provided on the rear corners of the blade 238 to the inclined members 242 and 243 with pins 292 so that the blade may swing through a vertical arc and hence raise or lower its sharpened cutting edge 247. A link member 293 is pivoted at one end on a pin 294 secured to each of the ears 291 and the free end of the link is provided with a plurality of spaced holes 296 which are selectively engageable with a pin 297 carried by each of the inclined members 242 and 243. Selective adjustment of the depth of cut and relative angle of attack of the blade may thus be effected by merely engaging pin 297 with the appropriate hole 296 in the link member.

As a feature of the present invention, power means 301 is provided for raising and lowering digging means 236 into and out of operating position in the ground so as to allow the machine to travel to and from the field to be harvested. As may best be seen from Figures 6, 7, 8 and 10 of the drawings, the power means 301 includes a hydraulic cylinder 302 adapted for connection to a source of hydraulic fluid under pressure (not shown), the cylinder being mounted in such manner as to provide a lifting action on the digging means 236 upon energizing of the cylinder. As here shown, a draw bar structure 303 is pivoted on a shaft 304 carried on the forward ends 306 of the frame beams 244 and 246 and extends forwardly therefrom to terminate in a hitch member 307 adapted for connection to the draw bar of a motive means such as a tractor (not shown). The hydraulic cylinder 302 is pivoted at its lower end 308 to the draw bar 303 medially the length thereof by means of a pin 309 engaged in ears 311 secured to the draw bar. A pair of forwardly inclined members 312 and 313 are secured to the beams 244 and 246 respectively and converge at their upper ends which are fixed to a curved member 314. The entire assembly of members 312–314 is of rugged construction braced by members 316 and 317 secured at their lower ends to the beams 244 and 246. The upper end of the hydraulic cylinder 302 is pivoted to the forward end of curved member 314 by a pin 318. As will be apparent from a consideration of Figures 6 and 7 of the drawings, the beams 244 and 246, the draw bar 303, the members 312–314, and the hydraulic cylinder 302 are arranged, with respect to their pivotal connections to each other, so as to move the entire assembly from the position shown in Figure 6 to that shown in Figure 7 upon energizing of the hydraulic cylinder. In this manner, the digging means 236, which is attached to the beams 244 and 246 through members 242 and 243, may be raised or lowered as desired, it being noted in this connection that the power means 301 may be employed also, by judicious energizing of the hydraulic cylinder 302, to selectively position the digging means so as to control the depth of the layer of crops and soil stripped from the field.

The harvesting machine of the present invention is especially suited for gently separating tender and easily damaged crops from the soil in which they are grown. Such gentle separation is effected by the above described construction of the trommels from circumferentially spaced sods and the mild rolling action created thereby upon rotation of the trommel, plus the gentle lifting and tumbling action exerted by the baffles. Additionally, and as an important feature of the invention, the portions of the machinery likely to come into contact with the crops may be of resilient construction so as to lessen the danger of bruising or cutting delicate roots or foliage. A modified form of the invention is illustrated in Figures 5 and 12 of the drawings which incorporates such resilient construction. As may be seen from Figure 5, the trommel rods 29 and the baffles 123 of trommel 21 (which are similar generally to rods 157 and baffles 266 of trommel 151) are formed with their outer surfaces 321 and 322 respectively of a resilient material. Preferably, this material is formed as a coating 323 bonded onto surfaces 321 and 322. Suitable resilient materials for this use are soft rubber, foamed rubber or rubber-like materials such as plastics of the polystyrene type, synthetic rubbers such as neoprene and the like.

As may be seen from Figure 12, the rods 252 making up the crop contacting portion of the conveyor 251 are constructed in the same manner as the trommel rods and baffles and have a resilient coating 324 bonded onto their outer surfaces 326 in the same manner that coating 323 is bonded to the outer surfaces of the trommel rods and baffles. With the surfaces of the machine which most forcefully contact the crops being harvested protected by resilient coatings 323 and 324 it will be apparent that any impact of the crops on such parts will be cushioned and the crops thereby protected from harm.

It will be appreciated that the harvesting machine of the present invention is not only particularly suited to the rapid and efficient separation and removal of crops having edible roots such as potatoes, carrots, turnips, beets, sugar beets and the like, but is also especially suited for separating and removing entire small plants from the soil for subsequent transplanting to other fields. One example of such plants which the present machine harvests with great efficiency and saving in labor is strawberry plants which are grown in a substantially solid mass in a field, are dug up and separated from the soil and each other and then sold for planting in gardens and/or commercial berry fields. It has been found that a harvesting machine constructed in accordance with the present invention can do the same amount of harvesting of strawberry plants as can be accomplished by scores of workers digging up and separating the plants by hand. For example, a trommel approximately six feet in diameter and 15 feet in length with a trommel rod spacing of about 1½ inches and rotating at 10 r.p.m. can receive and separate a layer of soil and crops approximately 8 inches deep and 30 inches wide stripped from the ground at a rate of 1½ to 3 miles per hour. Of course, the exact speed at which the machine will be most efficient is governed in great part by the character of the crop and the type and moisture content of the soil, the machine moving more slowly through wet and/or clayey soil and more rapidly through dry and/or sandy soil. In this connection it will be noted that the gasoline engine drive means for the trommel and conveyor may be adjusted to a speed most suitable for the speed at which the machine travels over the ground, and the means for adjustably varying the incline of the trommel will cooperate with the drive means to provide a very flexible accommodation of the machine to the various conditions which may be encountered during the harvesting operation. In operation, the trommel is preferably adjusted so that its axis is inclined somewhere between 3 to 6 degrees from the horizontal, with a 6 degree inclination being preferred in dry soil for more rapid passage of the soil and crops through the trommel. In wet soil conditions, especially in clay soils, the inclination may be reduced to as little as 3 degrees so the soil and crops will be retained in the trommel longer—say from 6 to 8 revolutions as contracted with 3 or 4 revolutions at the 6 degree inclination, the longer period insuring a clean separation of the soil from the crops.

While the salient features of this invention have been described in detail with respect to certain embodiments thereof, it will of course be apparent that certain modifications may be made within the spirit and scope of this invention, and it is not desired therefore to limit the invention to the exact details shown except insofar as they may be defined in the following claims.

What is claimed is:

1. A harvesting machine for digging and separating root crops and seedling crops from the soil comprising a wheeled chassis, a cylindrical rotary trommel having a multiply apertured wall, said trommel being pivotally mounted on said chassis substantially in alignment with the direction of travel thereof, said trommel having an open forward extremity for the receipt of crop containing soil, means connected between said chassis and said trommel for adjustably elevating the forward end thereof, drive means rotating said trommel about the central longitudinal axis thereof, a potato chain conveyer mounted on said chassis and extending forwardly and downwardly from said open forward end of said trommel substantially in alignment with the direction of travel of said chassis, a digging blade disposed below the forward end of said conveyer and aligned transverse to the direction of travel of said chassis, a drive motor driving said conveyer at a speed independent of the rotary motion of said trommel and at a speed substantially exceeding the forward speed of said chassis across the ground, and a plurality of soil lifting baffles disposed longitudinally within said trommel against the inner wall surface thereof, the forward ends of said baffles being angled in the direction of rotation of said trommel whereby soil received from said conveyer is immediately carried back from the forward end of said trommel.

2. In a digger and separator for the harvesting of root crops and seedling crops, the combination comprising a wheeled chassis having connections for coupling to a tractor, a cylindrical trommel formed of spaced apart parallel longitudinal rods, said trommel having an open forward end and being rotatably mounted on said chassis in alignment with the direction of travel thereof, said trommel being pivotally attached to said chassis at the rearward end thereof, drive means for rotating said trommel, at least one hydraulic cylinder connected between the forward end of said trommel and said chassis for adjustably elevating said forward end of said trommel, an inclined conveyer mounted on said chassis and projecting forwardly and downwardly from the forward end of said trommel, said conveyer having an endless belt formed of parallel spaced apart slats aligned transverse to the direction of travel of said belt, a flat digging blade disposed below the forward end of said conveyer transversely with respect to the direction of travel of said chassis, a motor driving said endless belt conveyer at a speed substantially exceeding the speed of said chassis over the ground whereby soil dug by said blade is pulled apart, and a plurality of baffles disposed against the inner wall of said trommel longitudinally therein, the forward ends of said baffles being inclined in the direction of rotation of said trommel whereby said pulled apart soil delivered to said trommel by said conveyer is immediately carried back from said open forward end of said trommel.

3. A digger and separator for the harvesting of root crops and seedling crops substantially as described in claim 2 wherein said baffles are three in number and spaced substantially equi-angularly around the circumference of said trommel.

4. In a harvesting apparatus for digging and separating root crops and seedling crops from the soil, the combination comprising a wheeled chassis having towing linkage for connection with a tractor and carrying a main frame, a subframe disposed on said chassis and pivotally connected to said main frame substantially at the rearmost end thereof, a cylindrical trommel having multiply perforated walls and an open forward end for the receipt of crop containing soil, said trommel being mounted on said subframe in alignment with the direction of travel of said chassis, said trommel further being rotatable about the central longitudinal axis, a first motor carried by said subframe and connected to rotate said trommel, at least one expansible hydraulic cylinder connected between said main frame and said subframe for adjustably elevating the forward end of said trommel, a plurality of baffles disposed longitudinally within said trommel against the inner wall thereof, the forward end of each baffle being inclined in the direction of rotation of said trommel, an inclined conveyer secured to said chassis and extending from the forward end of said trommel substantially to the ground surface directly forward from said trommel, said conveyor being of the endless belt class and characterized by spaced apart parallel slats disposed transversely with respect to the motion of the belt, a rectangular digging blade disposed beneath the forward end of said conveyor, and a second motor driving said endless belt of said conveyer at a speed substantially exceeding the forward speed of said chassis over the ground whereby said conveyer tears apart soil uprooted by said blade and delivers said soil to said trommel in broken apart condition.

References Cited in the file of this patent

UNITED STATES PATENTS

| | | |
|---|---|---|
| 1,957,290 | Railing | May 1, 1934 |
| 2,662,414 | Hertzler | Dec. 15, 1953 |
| 2,724,226 | Askviken et al. | Nov. 22, 1955 |